United States Patent [19]

Przybyla et al.

[11] 4,298,506

[45] Nov. 3, 1981

[54] METHOD OF TREATING SILVER OXIDE POWDER AND THE PRODUCT FORMED THEREFROM

[75] Inventors: Franciszek J. Przybyla, Mississauga; Eleanor J. Rossler, Lorne Park, both of Canada

[73] Assignee: Duracell International Inc., Bethel, Conn.

[21] Appl. No.: 957,598

[22] Filed: Nov. 3, 1978

[51] Int. Cl.$^3$ .............................................. H01B 1/06
[52] U.S. Cl. .................................... 252/518; 429/219; 423/604; 264/104
[58] Field of Search ........................ 252/518; 429/219; 423/604; 264/104

[56] References Cited
U.S. PATENT DOCUMENTS 3,057,944 10/1962 Ruetschi et al. ................ 429/219 X
4,096,328 6/1978 Kayama et al. ................. 429/219 X Primary Examiner—Brooks H. Hunt
Assistant Examiner—J. L. Barr
Attorney, Agent, or Firm—Ronald S. Cornell; Israel Nissenbaum; Martin M. Glazer

[57] ABSTRACT

A silver oxide powder for use in the cathode of an alkaline silver oxide galvanic cell, being a mixture of at least 10% divalent silver oxide powder together with monovalent silver oxide powder, is produced by at least partially reducing the silver oxide powder mixture by reacting it with a surfactant, particularly an anionic surfactant and thereafter removing the reactant. The silver oxide powder displays a lower oxygen evolution rate when immersed in an alkaline electrolyte, and lower internal friction during powder flow under pressure when compared with a similar silver oxide mixture which is known not to have been so reacted.

14 Claims, 1 Drawing Figure

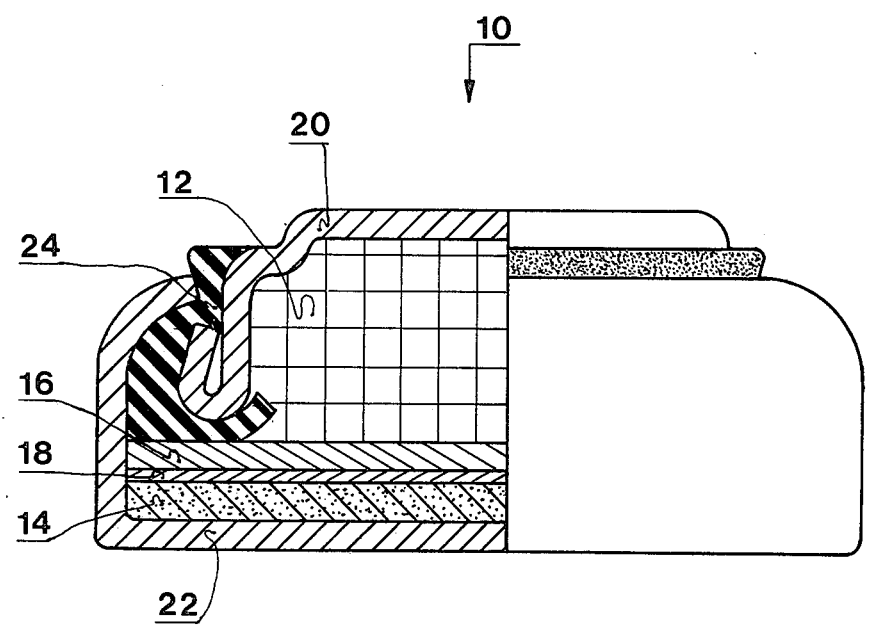

METHOD OF TREATING SILVER OXIDE POWDER AND THE PRODUCT FORMED THEREFROM

FIELD OF THE INVENTION

This invention relates to divalent silver oxide for use in electrochemical cells, and more particularly to a method for treating silver oxide powder and to cathodes compressed therefrom, for use in alkaline silver oxide galvanic cells, where the silver oxide powder mixture has had at least a minor amount of a surfactant, reacted therewith. Alkaline silver oxide galvanic cells having improved stability are thereby provided.

BACKGROUND OF THE INVENTION

Alkaline divalent silver oxide cells have been known for a considerable period of time. However, a requirement for miniature, high energy capacity cells of the button cell variety—where there is a high power output capability and high energy storage per unit volume—has recently arisen particularly in view of the wide acceptance of electrically powered watches and the like. During its shelf life or its operating life, it is important that these cells demonstrate dimensional stability; and to do so, the rate of oxygen evolution within the cell must not be greater than the sum of the rates of oxygen diffusion to the anode of the cell or oxygen reaction with the anode, and oxygen escape from the cell.

Because of their high power output and energy storage per unit volume, divalent silver oxide cells are particularly attractive. However, divalent silver oxide is generally considered to be unstable in the presence of an aqueous electrolyte, such as any of the alkaline electrolytes generally used in commercial silver oxide cells. It has particularly been desirable to improve the stability of divalent silver oxide cells so as to take advantage of the characteristics stated above. One approach has been by Samuel Ruben in the U.S. Pat. No. 2,542,710 issued Feb. 20, 1951. In that patent, Ruben recognized that a steel or nickel substrate on the cathode can of a button cell tends to decrease the stability of the divalent silver oxide which is used in the cathode; and Ruben provided a silver plating or cladding on the cathode can to offset the tendency to decreased stability.

Dawson, in U.S. Pat. No. 3,484,294, issued Dec. 16, 1969, discloses a cell having a cathode which consists principally of divalent silver oxide over which a masking layer of monovalent silver oxide is placed, and above which a cellophane barrier is located between the monovalent silver oxide layer and an electrolyte absorbent layer. The Dawson cell, however, requires that the secondary active material layer—the monovalent silver oxide layer—be electrolyte impermeable; and it is difficult to produce such a cell in commercial quantities. In addition, the cell is subject to dimensional instability due to internal gassing—i.e., oxygen evolution—at greater rates than the recombinant and/or out-gassing rates.

Davies, in U.S. Pat. No. 3,853,262 issued Dec. 10, 1974, discloses a gold additive which is incorporated in the cathode or the cathode compartment of a divalent silver oxide cell. The gold additive is said to improve the stability of the cell, but has the disadvantage of increasing the cost of the cell.

Tvarusko, in U.S. Pat. No. 3,650,832, issued Mar. 21, 1972, proposes the addition of mercury, selenium and tellurium to a divalent silver oxide cell cathode, to improve the stability and/or the electrical conductivity thereof. The method of incorporating the additives is by physical admixture or by chemical coprecipitation, during the preparation of the divalent silver oxide.

Dirkse, in U.S. Pat. No. 3,348,973, issued Oct. 24, 1967, discloses a secondary battery where there is present in said cell an additive having the general formula of tridecyloxypoly (ethylenoxy) ethanol said additive having been incorporated in the electrolyte or in the zinc anode, preferably in the zinc anode. Dirkse states that the life of the cell is significantly prolonged by the use of the additive.

Ruetschi et al, in U.S. Pat. No. 3,057,944, issued Oct. 9, 1962, discloses a silver oxide cathode in a primary or secondary system where a surface active heteropolar substance is admixed either to the electrolyte or the silver cathode in an amount ranging from about 0.001 gram to about 0.2 gram per gram of silver; whereby there may be formed a polar chemical group which can attach itself to the surface of the silver oxide particles of the cathode, with the remainder of the molecule being hydrophobic in nature so as to hinder contact with the electrolyte. Excessive gassing of the divalent silver oxide when wetted by an alkaline electrolyte is reduced.

In all of the above prior art cells, as in the present invention, the anode or negative electrode is generally comprised of an amalgamated zinc powder; and the alkaline electrolyte is an aqueous solution of potassium hydroxide, sodium hydroxide, or a mixture thereof. Additional additives may also be included in the anode or electrolyte.

SUMMARY OF THE INVENTION

It has been noted that certain of the prior art divalent silver oxide cells have been particularly subject to dimensional instability due to excessive gassing of the divalent silver oxide cathode material. In a related application, Ser. No. 957,597 filed on Nov. 3, 1978 there is disclosed a method for treating silver oxide with a fatty acid or an alkali metal salt thereof to reduce excessive gassing.

It has also been found that the dimensional stability of divalent silver oxide cells, where the principal cathode material is divalent silver oxide or mixtures of divalent silver oxide with monovalent silver oxide, may be greatly enhanced, in accordance with this invention, by the reaction of silver oxide powder mixture which comprises at least 10% divalent silver oxide, with at least a minor amount of a surfactant, particularly a surfactant of the ethylene oxide-adduct type, followed by removal of the surfactant. In so doing, it has been found that a silver oxide powder mixture which has been reacted with a surfactant has a much lower rate of oxygen evolution when wetted by an alkaline electrolyte, and a lower internal friction during powder flow under pressure then a similar silver oxide powder mixture which is known not to have been so reacted. In addition, a cathode pellet which has been compressed from a silver oxide powder mixture made in accordance with the invention also displays a lower rate of oxygen evolution when wetted by an aqueous alkaline electrolyte than a similar pellet which is known not to have been so reacted.

Thus, the present invention provides not only a silver oxide powder mixture for use in the cathode of an alkaline divalent silver oxide galvanic cell, but also a method of preparing and producing the cathode pellet, and a cell which includes the cathode pellet; all so as to exhibit greatly improved dimensional stability characteristics with respect to prior art cells, or with respect to similar cells having cathodes prepared from similar silver oxide powder mixtures which are known not to have been reacted with at least a minor amount of a surfactant.

BRIEF DESCRIPTION OF THE DRAWINGS

These and other features and objections of the invention are more specifically discussed hereafter, in association with the accompanying drawing which shows a typical cross-section of a simple button cell made in accordance with this invention, for purposes of discussion thereof.

DESCRIPTION OF THE PREFERRED EMBODIMENTS

In general, with reference to the single FIGURE of drawings, the discussion hereafter relates to a button cell 10 which comprises an anode 12 and a cathode 14. For the sake of discussion, and in keeping with general assembly found in commercial embodiments of button cells, there is shown a pair of layers between the anode 12 and the cathode 14. Those layers more particularly constitute an electrolyte absorbent separator 16 and a barrier layer 18, although the barrier layer 18 may be eliminated or there may be more than one absorbent separator. Other specific features may be included in any particular button cell. The anode, separators and cathode are retained in a container which includes an anode cap 20 and cathode can 22, so that they are electrically insulated one from the other and also to assist positively in mechanically sealing the cell. The upper edge of the cathode can 22 is crimped in a special tool designed for that purpose, so as to secure a grommet 24 in place against the upper edge of the cathode can and the lower edge of the anode cap; and the anode cap 20 and cathode can 22 function as the negative and positive terminals, respectively, for the cell.

In general, the anode 12 comprises a lightly compacted amalgamated zinc powder, to which has been added up to 10% by weight of mercury and up to 3% by weight of carboxymethylcellulose or other gelling agent. The electrolyte carrying separator (or separators) may comprise a cellulosic or permeable polymer material. The electrolyte is generally an aqueous solution of sodium hydroxide, potassium hydroxide, or a mixture of both. In addition, there may be up to 8% zinc oxide dissolved in the electrolyte.

It is known that silver ions can penetrate the absorbent, electrolyte carrying separator layer 16, so that the barrier layer 18 must be disposed against the cathode 14 so as to preclude or retard ionic flow from the cathode 14 towards the anode 12, at least of the soluble silver species present within the cathode compartment of the cell 10. The barrier layer 18 may be of any suitable material such as cellophane, polyethylene, polypropylene, polycarbonate, polyvinylchloride and combined layers thereof. A preferred barrier comprises a layer of radiation-grafted polyethylene and at least one continuous layer of cellophane.

As noted above, this invention provides a silver oxide powder mixture which may be used to produce the cathode 14 of a galvanic cell. The cathode is such that it unexpectedly imparts to cells a greatly improved dimensional stability when compared to that of divalent silver oxide cells of the prior art; and the dimensional stability of the cells comes as a consequence of the nature of the cathode, whereby the silver oxide powder mixture from which it has been produced has been reacted with at least a minor amount of a surfactant.

Referring now specifically to the cathode 14, it is a compressed pellet which is formed from a silver oxide powder mixture according to this invention. That powder mixture may be a commercially available divalent silver oxide powder, or it may be a mixture of divalent and monovalent silver oxides and in any event it has at least 10% divalent silver oxide constituent and includes at least a minor amount of monovalent silver oxide constituent. Other, compatible additives, such as graphite or tetrafluoroethylene powder, may also be present. Moreover, the silver oxide powder mixture has had at least a minor amount of a surfactant, reacted therewith; and then removed. The quantity of surfactant used as a reagent can vary from about 1 percent to about 20 percent by weight of the silver oxide powder mixture and preferably it is from about 5 percent to about 10 percent.

The divalent silver oxide constituent may, therefore, be present in the amount of about 10–99% by weight, with the monovalent silver oxide constituent being present in an amount of from about 1 to 90% by weight. Where the powder mixture is so constituted, and a cathode pellet is compressed from it, as discussed hereafter, a divalent silver oxide cell having that cathode exhibits improved dimensional stability.

As to the powder mixture, it has been unexpectedly noted to exhibit certain characteristics when compared with a similar powder mixture which is known not to have been reacted with at least a minor amount of a surfactant, as required by the present invention. These characteristics are such that, if the powder is immersed in or wetted by an alkaline electrolyte, the reacted (treated) silver oxide powder mixture displays a lower rate of oxygen evolution. Further, the reacted powder mixture demonstrates a lower internal friction during powder flow under pressure, so that pellet pressing may be accomplished without adding an additional lubricant. In addition, a compressed pellet, when formed, may have a more consistent or uniform density throughout.

It is believed that a silver oxide powder mixture according to this invention, having been reacted with at least a minor amount of a surfactant as referred to herein, is such that each particle of the silver oxide powder mixture exhibits a heterogeneous combination of divalent silver oxide and monovalent silver oxide, substantially in the same proportions as of the powder itself.

The surfactants that are useful in accordance with this invention can be anionic, nonionic, amphoteric zwitterionic, polar nonionic, or cationic synthetic organic surfactants or a mixture of two or more of the foregoing types of surfactants.

Useful anionic surface active agents include those surface active compounds which contain an organic hydrophobic group containing generally 8 to 26 carbon atoms and preferably 10 to 18 carbon atoms in their molecular structure, and at least one water-solubilizing group selected from the group of sulfonate, sulfate, carboxylate, phosphonate and phosphate so as to form a water-soluble surfactant.

The anionic class of surfactants includes the water-soluble sulfated and sulfonated synthetic surfactants having an alkyl radical of 8 to 26, and preferably about 12 to 22 carbon atoms, in their molecular structure. (The term alkyl includes the alkyl portion of higher acyl radicals.)

Examples of sulfonated anionic surfactants include higher alkyl aromatic sulfonates such as the higher alkyl benzene sulfonates containing from 10 to 16 carbon atoms in the higher alkyl group in a straight or branched chain, e.g., the sodium, potassium and ammonium salts of higher alkyl benzene sulfonates, higher alkyl toluene sulfonates, higher alkyl phenol sulfonates, and higher naphthalene sulfonates. A preferred sulfonate is linear alkyl benzene sulfonate having a high content of 3- (or higher) phenyl isomers and a correspondingly low content (well below 50 percent) of 2- (or lower) phenyl isomers, i.e., wherein the benzene ring is preferably attached in large part at the 3 or higher (e.g., 4, 5, 6 or 7) position of the alkyl group and the content of isomers in which the benzene ring is attached at the 2 or 1 position is correspondingly low.

Other suitable anionic surfactants are the olefin surfonates, including long-chain alkene sulfonates, long-chain hydroxyalkane sulfonates or mixtures of alkene-sulfonates and hydroxyalkane-sulfonates. These olefin sulfonate surfactants may be prepared in a known manner by the reaction of $SO_3$ with long-chain olefins containing 8 to 25, preferably 12-21, carbon atoms and having the formula $RCH=CHR_1$ where R is a higher alkyl group of 6 to 23 carbons and $R_1$ is an alkyl group of 1 to 17 carbons or hydrogen to form a mixture of sultones and alkene-sulfonic acids which is then treated to convert the sultones to sulfonates.

Further examples of sulfate or sulfonate surfactants are paraffin sulfonates containing about 10–20, preferably about 15–20, carbon atoms, e.g., the primary paraffin sulfonates made by reacting long-chain alpha olefins and bisulfites and paraffin sulfonates having the sulfonate groups distributed along the paraffin chain as shown in U.S. Pat. Nos. 2,503,280; 2,507,088; 3,260,741; and 3,372,188; sodium and potassium sulfates of higher alcohols containing 8 to 18 carbon atoms such as sodium lauryl sulfate and sodium tallow alcohol sulfate; sodium and potassium salts of α-sulfofatty acid esters containing about 10 to 20 carbon atoms in the acyl group, e.g., methyl α-sulfomyristate and methyl α-sulfo-tallowate, ammonium sulfates of mono- or diglycerides of higher ($C_{10}$–$C_{18}$) fatty acids, e.g., stearic monoglyceride monosulfate; sodium and alkylolammonium salts of alkyl polyethenoxy ether sulfates produced by condensing 1 to 5 moles of ethylene oxide with one mole of higher ($C_8$–$C_{18}$) alcohol; sodium higher alkyl ($C_{10}$–$C_{18}$) glyceryl ether sulfonates; and sodium or potassium alkyl phenol polyethenoxy ether sulfates with about 1 to 6 oxyethylene groups per molecule and in which the alkyl radicals contain about 8 to about 12 carbon atoms.

The suitable anionic detergents include also the $C_8$–$C_{18}$ acyl sarcosinates (e.g. sodium lauroyl sarcosinate), sodium and potassium salts of the reaction product of higher fatty acids containing 8 to 18 carbon atoms in the molecule esterified with isethionic acid, and sodium and potassium salts of the $C_8$–$C_{18}$ acyl N-methyl taurides, e.g., sodium cocoyl methyl taurate and potassium stearoyl methyl taurate.

Anionic phosphate surfactants in which the anionic solubilizing group attached to the hydrophobic group is an oxyacid of phosphorus are particularly useful. Suitable phosphate surfactants are the sodium, potassium, and ammonium alkyl phosphate mono and diesters such as $(R-O)_2PO_2M$ and $ROPO_3M_2$ in which R represents an alkyl chain containing from about 8 to about 20 carbon atoms, a phenyl group, or an alkyl phenyl group having 8 to 20 carbon atoms and M represents a soluble cation. The compounds formed by including about one to 40 moles of ethylene oxide in the foregoing esters, e.g., [RO(EtO)n]PO(OM)y are highly preferred.

The particular anionic surfactant salt will be suitably selected from the ammonium, substituted ammonium (mono-, di- and triethanolammonium), alkali metal (such as sodium and potassium) and alkaline earth metal (such as calcium and magnesium) salts of the higher alkyl benzene sulfonates, olefin sulfonates, higher alkyl sulfates, higher fatty acid monoglyceride sulfates, and higher acyl sarcosinates. Particularly desirable salts of this type include the ammonium, triethanolammonium, sodium and potassium salts of the higher alkyl sulfates and the $C_8$–$C_{18}$ acyl sarcosinates.

Useful nonionic synthetic organic surfactants are generally the condensation product of an organic aliphatic or alkyl aromatic hydrophobic compound and hydrophilic alkylene oxide groups. Practically any hydrophobic compound having a carboxy, hydroxy, amido, or amino group with a free hydrogen attached to the nitrogen can be condensed with an alkylene oxide such as ethylene oxide or with the polyhydration products thereof, e.g. polyethylene glycol, to form a nonionic surfactant. Further, the length of the polyalkyleneoxy chain can be adjusted to achieve the desired balance between the hydrophobic and hydrophilic elements.

Useful for the nonionic compound type of hydrophobes are higher aliphatic alcohols and alkyl phenols, although others may be used such as carboxylic acids, carboxamides, mercaptans, sulphonamides, etc. The ethylene oxide condensates with higher-alkyl phenols represent a preferred class of nonionic compounds. Usually the hydrophobic moiety should contain at least about 6 carbon atoms, and preferably at least about 8 carbon atoms, and may contain as many as about 50 carbon atoms or more. The amount of alkylene oxide will vary considerably depending upon the hydrophobe, but as a general guide and rule, at least about 5 moles of alkylene oxide per mole of hydrophobe should be used. The upper limit of alkylene oxide will vary, also, but not particular criticality can be ascribed thereto. As much as 200 or more moles of alkylene oxide per mole of hydrophobe may be employed. While ethylene oxide is the preferred and predominating oxyalkylating reagent, other lower alkylene oxides such as prophlene oxide, butylene oxide, and the like may also be used or substituted in part for the ethylene oxide.

Other nonionic compounds which are suitable are the polyoxyalkylene esters of the organic acids such as the higher fatty acids, the rosin acids, tall oil acids, acids from petroleum oxidation products, etc. These esters will usually contain from about 10 to about 22 carbon atoms in the acid moiety and from about 12 to about 30 moles of ethylene oxide or its equivalent.

Still other nonionic surfactants are the alkylene oxide condensates with the higher fatty acid amides. The fatty acid group will generally contain from about 8 to about 22 carbon atoms and this will be condensed with about 10 to about 50 moles of ethylene oxide. The corresponding carboxamides and sulphonamides may also be used as substantial equivalents.

Still another class of nonionic products are the oxyalkylated higher aliphatic alcohols. The fatty alcohols should contain at least 6 carbon atoms, and preferably at least about 8 carbon atoms. The most preferred alcohols are lauryl, myristyl, cetyl, stearyl and oleyl alcohols and the said alcohols should be condensed with at least about 6 moles of ethylene oxide and, preferably, about 10 to 30 moles of ethylene oxide. A typical nonionic product is oleyl alcohol condensed with 15 moles of ethylene oxide. The corresponding alkyl mercaptans when condensed with ethylene oxide are also admirably suitable in the compositions of the present invention.

Still other suitable nonionics are the polyoxyethylene polyoxypropylene adducts of 1-butanol. The hydrophobe of these nonionics has a minimum molecular weight of 1,000 and consists of an aliphatic monohydric alcohol containing from 1 to 8 carbon atoms to which is attached a heteric chain of oxyethylene and oxypropylene. The weight ratio of oxypropylene to oxyethylene covers the range of 95:5 to 85:15. Attached to this is the hydrophilic polyoxyethylene chain which is from 44.4 to 54.6 percent of the total molecular weight of 1,400 to 4,000.

Another useful group of nonionics is marketed under the trade name "Pluronics". The compounds are formed by condensing ethylene oxide with a hydrophobic base formed by the condensation of propylene oxide with propylene glycol. The molecular weight of the hydrophobic portion of the molecule is of the order of 950 to 4,000 preferably 1,200 to 2,500. The addition of polyoxyethylene radicals to the hydrophobic portion tends to increase the solubility of the molecule as a whole. The molecular weight of the block copolymers varies from 1,100 to 15,000 and the polyethylene oxide content may comprise 20 to 80 percent by weight.

Suitable nonionics may be derived by the condensation of ethylene oxide with the product resulting from the reaction of propylene oxide and ethylene diamine. The molecular weight varies from 500 to 4,500.

Other nonionic surfactants include the ethylene oxide addends of monoesters of hexahydric alcohols and inner ethers thereof with higher fatty acids containing about 10 to 20 carbon atoms, e.g., sorbitan monolaurate, sorbitan mono-oleate, and mannitan monopalmitate.

The amphoteric surfactants which can be used are generally water-soluble salts of derivatives of aliphatic amines which contain at least one cationic group. Zwitterionic detergents such as the betaines and sulfobetaines are also useful.

Polar nonionic surfactants are those in which the hydrophilic group contains a semi-polar bond directly between two atoms, for example, $N{\rightarrow}O$; $P{\rightarrow}O$; $As{\rightarrow}O$; and $S{\rightarrow}O$. There is charge separation between the two directly bonded atoms, but the detergent molecule bears no net charge and does not dissociate into ions.

The polar nonionic surfactants of this invention include open-chain aliphatic amine oxides of the general formula $R_1R_2R_3N\,O$. For the purpose of this invention $R_1$ is an alkyl, alkenyl, or monohydroxyalkyl radical having about 10 to 20 carbon atoms. $R_2$ and $R_3$ are each selected from the group consisting of methyl, ethyl, propyl, ethanol, and propanol radicals.

Other operable polar nonionic surfactants are the open-chain aliphatic phosphine oxides having the general formula $R_1R_2R_3P\,O$ wherein $R_1$ is an alkyl, alkenyl, or monohydroxyalkyl radical ranging in chain length from 10 to 18 carbon atoms, and $R_2$ and $R_3$ are each alkyl and monohydroxyalkyl radicals containing from 1 to 3 carbon atoms.

Cationic surface active agents may also be employed. Such agents are those surface active compounds which contain an organic hydrophobic group and a cationic solubilizing group. Typical cationic solubilizing groups are amine and quaternary groups.

Examples of suitable synthetic cationic surfactants are normal primary amines $RNH_2$ wherein R is $C_{12}$-$C_{15}$; the diamines such as those of the type $RNHC_2H_4NH_2$ wherein R is an alkyl group of about 12 to 22 carbon atoms, such as N-2-aminoethyl stearyl amine and N-2-aminoethyl myristyl amine; amide-linked amines such as those of the type $R_1CONHC_2H_4NH$ wherein $R_1$ is an alkyl group of about 8 to 20 carbon atoms, such as N-2-amino ethylstearyl amide and N-amino ethylmyristyl amide; quaternary ammonium compounds wherein typically one of the groups linked to the nitrogen atom is an alkyl group of about 8 to 22 carbon atoms and three of the groups linked to the nitrogen atom are alkyl groups which contain 1 to 3 carbon atoms, including alkyl groups bearing inert substituents, such as phenyl groups, and there is present an anion such as halogen, acetate, methosulfate, etc. The alkyl group may contain intermediate linkages such as amido which do not substantially affect the hydrophobic character of the group, e.g., stearyl amido propyl quaternary ammonium chloride. A typical quaternary ammonium surfactant is ethyl-dimethyl-stearyl ammonium chloride.

There are several well known methods whereby a mixture of divalent silver oxide and monovalent silver oxide may be produced, or commercially available divalent silver oxide powder may be obtained; but the powder which is so produced or obtained normally exhibits high internal resistance to powder flow under pressure, and higher rates of oxygen evolution when immersed in or wetted by an aqueous alkaline electrolyte then silver oxide powder mixtures according to this invention.

In any event, a method of producing a silver oxide powder mixture according to this invention may include at least the steps of partially reducing a mixture having at least 10% divalent silver oxide powder, the remainder including at least a minor amount of monovalent silver oxide powder, by reacting the silver oxide powder mixture with a reagent which is a surfactant, thereafter removing the reagent from the reacted silver oxide powder mixture.

Generally, the step of removing the reagent from the reacted silver oxide powder mixture is accomplished by washing the reacted powder with water until no further trace of reagent is noted to be washed from the reacted mixture.

The above process may be controlled, in accordance with a preferred practice according to this invention, so that at least 1% of divalent silver oxide constituent present in the mixture is reduced to monovalent silver oxide.

Following washing and drying of the reacted silver oxide powder mixture, it is believed that less than about 0.05% by weight of reagent remains in the silver oxide powder mixture. Nonetheless, unexpected improvements in dimensional stability characteristics of the cathode material have been consistently noted.

Accordingly, a cathode pellet having uniform density can be produced from a homogeneous silver oxide powder in keeping with this invention using standard pelleting and consolidating techniques and operations, even without the addition of any further lubricant.

Following the production of a homogeneous silver oxide powder mixture according to this invention, such as by the process discussed above, whereby the silver oxide powder mixture is reacted with at least a minor amount of a surfactant, an alkaline cell may be assembled having a compressed and pelleted anode and cathode, at least one electrolyte carrying separator disposed between them, where the combination is retained in a conductive retainer, all as discussed above with reference to the drawing. Thus, the cathode has at least 10% divalent silver oxide constituent and at least a minor amount of monovalent silver oxide constituent.

There may, in addition to the structure discussed above with reference to the general showing of a button cell in the figure of drawings, be various modifications made such as the addition of an interposed silver screen or layer above the cathode 14, either between the cathode 14 and the barrier layer 18, or between the barrier layer 18 and the separator 16. Such additional silver layer may be expanded metal, porous foil, or metallic silver deposited on the surface of the separator; or the interposed silver layer may be formed by short-circuiting or predischarging the cell so as to form a layer of metallic silver on the cathode 14. In any event, a silver layer may be formed on the surface of the cathode.

Several examples follow which illustrate the application of this invention and the advantages derived therefrom in respect of improved stability characteristics of button cells having cathodes produced from silver oxide powder mixtures in keeping with this invention.

COMPARATIVE EXAMPLE A

72 Grams of sodium hydroxide in pellet form was added to one liter of water, and the temperature of the solution was maintained at approximately 85° C. Thereafter, 75 grams of potassium persulfate was added to the hot alkaline solution. Following the above step, 51 grams of silver nitrate was dissolved in a minimum amount of water which was then mixed with the hot alkaline solution, with the temperature of the resulting mixture being permitted to rise to about 90° C. The product was stirred and maintained at about 90° C. for a period of approximately 15 minutes.

Thereafter, a precipitate of predominantly black divalent silver oxide powder was filtered, and the sulphate ions and other impurities were removed therefrom by washing the precipitate with de-ionized water which was made slightly alkaline by the addition of sodium hydroxide thereto. The resulting product was then dried (it could have deen air dried, but was oven dried at a temperature of about 60° C.) to constant weight.

The silver oxide powder mixture which came from the above process could not be compressed into a cathode pellet of uniform density, without a lubricating additive. Suitable lubricants for such purposes are known in the art, and include fluorocarbon powders or liquids, graphite and other lubricants which are well known in the art of powder metallurgy.

It was noted that the rate of oxygen evolution from one gram of powder, immersed in a 30% potassium hydroxide solution containing also 2% zinc oxide, and kept at a temperature of 45° C., amounted to 150 micro liters per gram per day. Cathode pellets for standard MS76 size button cells were produced, having 0.75 grams of cathode powder with lubricant additive, in accordance with usual manufacturing procedures. A number of cells were made and tested, and underwent an average height increase of 0.015 inches of the cathode pellets during two weeks storage at 45° C. Two out of ten cells ruptured after ten weeks storage at 45° C.

EXAMPLE 1

Following the procedure for preparation of the predominantly black divalent silver oxide powder mixture as discussed above in Comparative Example A, and after precipitation thereof, approximately 5 ml of GAFAC RA600* was introduced into the reaction vessel. The solution temperature was maintained at about 90° C., and the GAFAC RA600 was allowed to react for about 15 minutes. Filtering, washing and drying of the product was carried out as in Comparative Example A.

*An anionic complex organic phosphate ester supplied by GAF Corporation as the free acid, based on a linear primary alcohol, and being an unneutralized partial ester of phosphoric acid.

By chemical analysis of the resultant dried silver oxide powder mixture, that powder mixture was found to contain 70% divalent silver oxide and 30% monovalent silver oxide. It was noted that the dry powder, which had had GAFAC RA600 reacted therewith could easily be compressed into a cathode pellet of uniform density without using any lubricating additive.

The rate of oxygen evolution from one gram of the silver oxide powder mixture, when immersed in a 30% potassium hydroxide solution containing also 2% zinc oxide, and kept at a temperature of 45° C., was 23 micro liters per gram per day.

A number of MS76 size button cells were prepared having cathode pellets which were compressed from the silver oxide powder mixture made in this example, and during two weeks of storage at 45° C., the cells were noted to have undergone an average height increase of less than 0.001 inch. All of the cells survived 12 weeks of storage at 45° C., and none of the cells suffered height increases of greater than 0.002 inches.

EXAMPLE 2

Following the procedure for preparation of the black divalent silver oxide powder as discussed above in Comparative Example A, and after precipitation thereof, approximately 5% of Klearfac AA-040* was introduced into the reaction vessel. The solution temperature was maintained at about 90° C., and the Klearfac AA-040 was allowed to react for about 30 minutes. Filtering, washing and drying of the product was carried out as in Comparative Example A.

*An anionic mono substituted ortho phosphate ester supplied by Wyandotte Chemicals Corp.

By chemical analysis of the resultant dried powder, that powder was found to contain 70% divalent silver oxide and 30% monovalent silver oxide. It was noted that the dry powder, which had had Klearfac AA-040 reacted therewith could be easily compressed into a cathode pellet of uniform density without using any additive.

The rate of oxygen evolution from one gram of the powder, when immersed in a 30% potassium hydroxide solution containing also 2% zinc oxide, and kept at a temperature of 45° C., was 30 micro liters per gram per day.

A number of MS76 size button cells were prepared having cathode pellets which were compressed from the powder made in this example, and during two weeks of storage at 45° C., the cathode pellets were noted to have undergone an average height increase of 0.001 inch. Ten out of ten cells survived 12 weeks of storage at 45° C., and none of the cells suffered height increases of greater than 0.002 inches.

EXAMPLE 3

Following the procedure for preparation of the black divalent silver oxide powder as discussed above in Comparative Example A, and after precipitation thereof, approximately 5% of Duomeen CD-50* was introduced into the reaction vessel. The solution temperature was maintained at about 90° C., and the Duomeen CD-50 was allowed to react for about 30 minutes. Filtering, washing and drying of the product was carried out as in Comparative Example A.

*A cationic alkyl propylene diamine supplied by Armour Industrial Chemicals.

By chemical analysis of the resultant dried powder, that powder was found to contain 70% divalent silver oxide and 30% monovalent silver oxide. It was noted that the dry powder, which had had Duomeen CD-50 reacted therewith could be easily compressed into a cathode pellet of uniform density without using any additive.

The rate of oxygen evolution from one gram of the powder, when immersed in a 30% potassium hydroxide solution containing also 2% zinc oxide, and kept at a temperature of 45° C., was 30 micro liters per gram per day.

A number of MS76 size button cells were prepared having cathode pellets which were compressed from the powder made in this example, and during two weeks of storage at 45° C., the cathode pellets were noted to have undergone an average height increase of 0.001 inch. Ten out of ten cells survived 12 weeks of storage at 45° C., and none of the cells suffered height increases of greater than 0.002 inches.

EXAMPLE 4

The procedure outlined in the previous examples was followed but employing approximately 5% of Sulfyrol 440*.

* A nonionic reaction product of ethylene oxide and acetylenic glycol supplied by Anco Chemicals Ltd.

The resultant dried powder was found to contain 70% divalent silver oxide and 30% monovalent silver oxide, and could be easily compressed into a cathode pellet of uniform density without using any additive.

The rate of oxygen evolution from one gram of the powder, when immersed in a 30% potassium hydroxide solution containing also 2% zinc oxide, and kept at a temperature of 45° C., was 30 micro liters per gram per day. MS76 size button cells prepared from cathode pellets which were compressed from the powder made in this example exhibited similar results to those obtained in Examples 1-3.

EXAMPLE 5

In the same manner as Examples 1-4 above, the anionic polyethoxy phosphate ester surfactant of the type commercially designed as GAFAC RE610*, was reacted with the silver oxide powder mixture, with similar results.

*GAFAC RE610 is an anionic complex organic phosphate ester similar to GAFAC RA600, described in Example 1, but is based on a phenol as opposed to a linear alcohol.

The examples given above have been for purposes of illustration, and the single FIGURE of drawings is intended also to be illustrated and not restrictive with respect to any button cell which might be produced according to this invention, all of which may occur without departing from the spirit and scope of the appended claims.

What is claimed is:

1. A process for producing silver oxide for use in the cathode of an alkaline silver oxide galvanic cell, including the steps of partially reducing a mixture having at least 10% divalent silver oxide powder, the remainder including at least a minor amount of monovalent silver oxide powder, by reacting said silver oxide powder mixture with a surfactant and removing the reagent from the reacted silver oxide powder mixture.

2. The process of claim 1, where said silver oxide power mixture is reacted with from 1% to 20% by weight of a surfactant.

3. The process of claim 1, where said silver oxide powder mixture is reacted with from 5% to 10% by weight of a reagent.

4. The process of claim 1, where said reagent is removed from said reacted silver oxide powder mixture by washing said reacted mixture.

5. The process of claim 4, including the additional step of pressing a given amount of the washed, reacted silver oxide powder mixture.

6. The process of claim 1, where the amount of reduction of divalent silver oxide constituent of said reacted silver oxide powder mixture, to monovalent silver oxide, is at least 1% by weight of said divalent silver oxide constituent.

7. A silver oxide mixture for use in the cathode of an alkaline silver oxide galvanic cell, produced by the process of claim 1.

8. The process of claim 1, wherein the surfactant is chosen from the group consisting of anionic, nonionic, amphoteric, zwitterionic, polar nonionic, and cationic synthetic organic detertents and mixtures thereof.

9. A cathode pellet formed by the process of claim 5, said cathode pellet, when immersed in an alkaline cell electrolyte, displaying a low rate of oxygen evolution.

10. The silver oxide powder mixture of claim 7, where the divalent silver oxide constituent is present in an amount of from 10% to 99% by weight, and the monovalent silver oxide constituent is present in an amount of from 1% to 90% by weight.

11. The silver oxide powder mixture of claim 7, wherein the surfactant is present in said powder in an amount of less than 0.05% by weight.

12. An alkaline silver oxide galvanic cell comprising an anode, a cathode, and at least one electrolyte carrying separator disposed between said anode and said cathode, the combination being retained in a conductive retainer having a negative terminal electrically associated with said anode and a positive terminal electrically associated with said cathode, both terminals being electrically insulated from one another; where said cathode comprises a pellet formed from the silver oxide of claim 1.

13. The alkaline silver oxide galvanic cell of claim 12, wherein the silver oxide is a mixture of divalent silver oxide in an amount of from 10% to 99% by weight, and monovalent silver oxide in an amount of from 1% to 90% by weight.

14. In a method for producing a cell having a silver oxide cathode the improvement for reducing internal gassing comprising the steps of reacting particulate silver oxide with a surfactant, thereafter removing the excess surfactant from the silver oxide, and then forming the cathode.

* * * * *